United States Patent
Ganzel (10) Patent No.: US 7,325,884 B2
(45) Date of Patent: *Feb. 5, 2008

(54) MODULAR REGENERATIVE BRAKING

(75) Inventor: Blaise Ganzel, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/544,122

(22) Filed: Oct. 6, 2006

(65) Prior Publication Data

US 2007/0024111 A1 Feb. 1, 2007

Related U.S. Application Data

(63) Continuation of application No. 10/827,057, filed on Apr. 19, 2004, now Pat. No. 7,150,508.

(51) Int. Cl.
*B60T 8/34* (2006.01)
(52) U.S. Cl. .................. 303/113.4; 303/113.1
(58) Field of Classification Search .. 303/113.1–113.5, 303/114.1, 116.1, 116.2, 119.1, 114.2; 188/358, 188/359
See application file for complete search history.

(56) References Cited

U.S. PATENT DOCUMENTS

| | | | |
|---|---|---|---|
| 5,941,608 A | 8/1999 | Campau et al. | |
| 6,053,582 A | 4/2000 | Ganzel | |
| 6,183,050 B1 | 2/2001 | Ganzel | |
| 6,186,602 B1 | 2/2001 | Jonner et al. | |
| 6,189,982 B1 | 2/2001 | Harris et al. | |
| 6,206,484 B1 | 3/2001 | Ganzel | |
| 6,217,129 B1 | 4/2001 | Ganzel | |
| 6,454,365 B1 | 9/2002 | Arwine et al. | |
| 6,491,354 B1 | 12/2002 | Caldwell | |
| 6,584,397 B2 | 6/2003 | Tanaka et al. | |
| 6,623,088 B2 | 9/2003 | Roden et al. | |

OTHER PUBLICATIONS

Written Opinion Of The International Searching Authority, PCT/US2003/013088.

*Primary Examiner*—Christopher P. Schwartz
(74) *Attorney, Agent, or Firm*—MacMillan, Sobanski & Todd, LLC (57) ABSTRACT

A brake module provides a first circuit, a second circuit, and a third circuit of pressurized brake fluid. A first set and second set of brake actuators are operated by the application of pressurized brake fluid. A first and second fluid separator unit are integrated between the first and second circuit, and the first and third circuit, respectively, for substantially preventing any intermixing of pressurized brake fluid between the first, second, and third circuits. The first and second fluid separator units include a moveable pressure boundary which enables the second circuit and third circuit of pressurized brake fluid to selectively act upon the first set and second set of brake actuators in response to the first circuit of pressurized brake fluid acting upon the first and second fluid separator units. At least one proportional valve selectively controls the pressurized brake fluid of the first circuit for acting on the first and the second fluid separator units.

25 Claims, 8 Drawing Sheets

MODULAR REGENERATIVE BRAKING

CROSS REFERENCE TO RELATED APPLICATIONS

This application is a continuation of U.S. patent application Ser. No. 10/827,057, filed Apr. 19, 2004, now U.S. Pat. No. 7,150,508 the disclosures of which are incorporated by reference.

STATEMENT REGARDING FEDERALLY SPONSORED RESEARCH

Not Applicable.

BACKGROUND OF THE INVENTION

1. Field of the Invention

The present invention relates in general to regenerative assisted braking, and more specifically, to a braking module for applying a remaining braking torque in addition to the regenerative braking torque.

2. Description of the Related Art

Electro-hydraulic braking systems with manually powered backup systems are used for actuating the vehicle brakes. The electro-hydraulic braking systems typically include three main hydraulic circuits. Two circuits include manual push through wherein isolation valves fluidically separate a manually powered master cylinder from the brake actuators. These isolation valves are ordinarily shut during normal braking mode to allow boost circuit controlled pressure to act on the hydraulic brake actuators of the manual push through circuits. As an operator of the vehicle depresses the brake pedal, the pressurized brake fluid is delivered to a brake simulator. Pressure transducers and pedal travel sensors are used to determine the braking level being commanded by the operator. Signals are sent to a control module, which in turn controls a motor/pump(s) and solenoid valve(s) in the first circuit to provide hydraulic braking fluid to act on the hydraulic actuators. In the event of a power failure or loss of hydraulic brake fluid of the first circuit, the isolation valves in the second and third circuits are opened to allow the operator to manually push through to actuate the front vehicle brake actuators during a fail-safe condition. Such a system is shown in U.S. Pat. No. 5,941,608 using multiple three-way proportional valves and pressure sensors. Each electronic device requires electrical power to energize and maintain the operation of each of the electrical devices. The use of electrical energy for energizing each electrical component within the electric-hydraulic braking system results in energy depletion. The more electrical devices within a system, the more the power consumption which is ultimately counter-productive to a system used in cooperation with regenerative braking being that the primary purpose of the regenerative braking is to recapture energy.

SUMMARY OF THE INVENTION

The present invention has the advantage of reducing the number of three-way proportional valves and pressure sensors required to sense pressure at each proportional valve which reduces the cost and complexity of the modular braking unit. Furthermore, because of the reduction of the number of electrical devices used in the modular braking unit, less energy will be required to maintain operation of the electrical devices which is productive when using regenerative braking. Moreover, the above modular braking unit is compatible with regenerative braking and low cost conventional modular slip control HCU's.

In one aspect of the invention, a brake module provides a first (pump) circuit of pressurized brake fluid and a second (brake) and a third (brake) circuit of pressurized brake fluid. A first set of brake actuators is operated by the application of pressurized brake fluid and a second set of brake actuators is operated by the application of pressurized brake fluid. A first fluid separator unit is coupled to the first circuit and the second circuit for substantially preventing the intermixing of pressurized brake fluid between the first circuit and the second circuit. The first fluid separator unit includes a moveable pressure boundary which enables, through movement thereof, the second circuit of pressurized brake fluid to selectively act upon the first set of brake actuators in response to the first circuit of pressurized brake fluid acting upon the first fluid separator unit. A second fluid separator unit is coupled to the first circuit and the third circuit for substantially preventing the intermixing of pressurized brake fluid of the first circuit and the third circuit. The second fluid separator unit includes a moveable pressure boundary which enables, through movement thereof, the third circuit of pressurized brake fluid to selectively act upon the second set of brake actuators in response to the first circuit of pressurized brake fluid acting upon the second fluid separator unit. At least one proportional valve selectively controls the pressurized brake fluid of the first circuit acting on the first and the second fluid separator units.

DETAILED DESCRIPTION OF PREFERRED EMBODIMENTS

Figure 1:
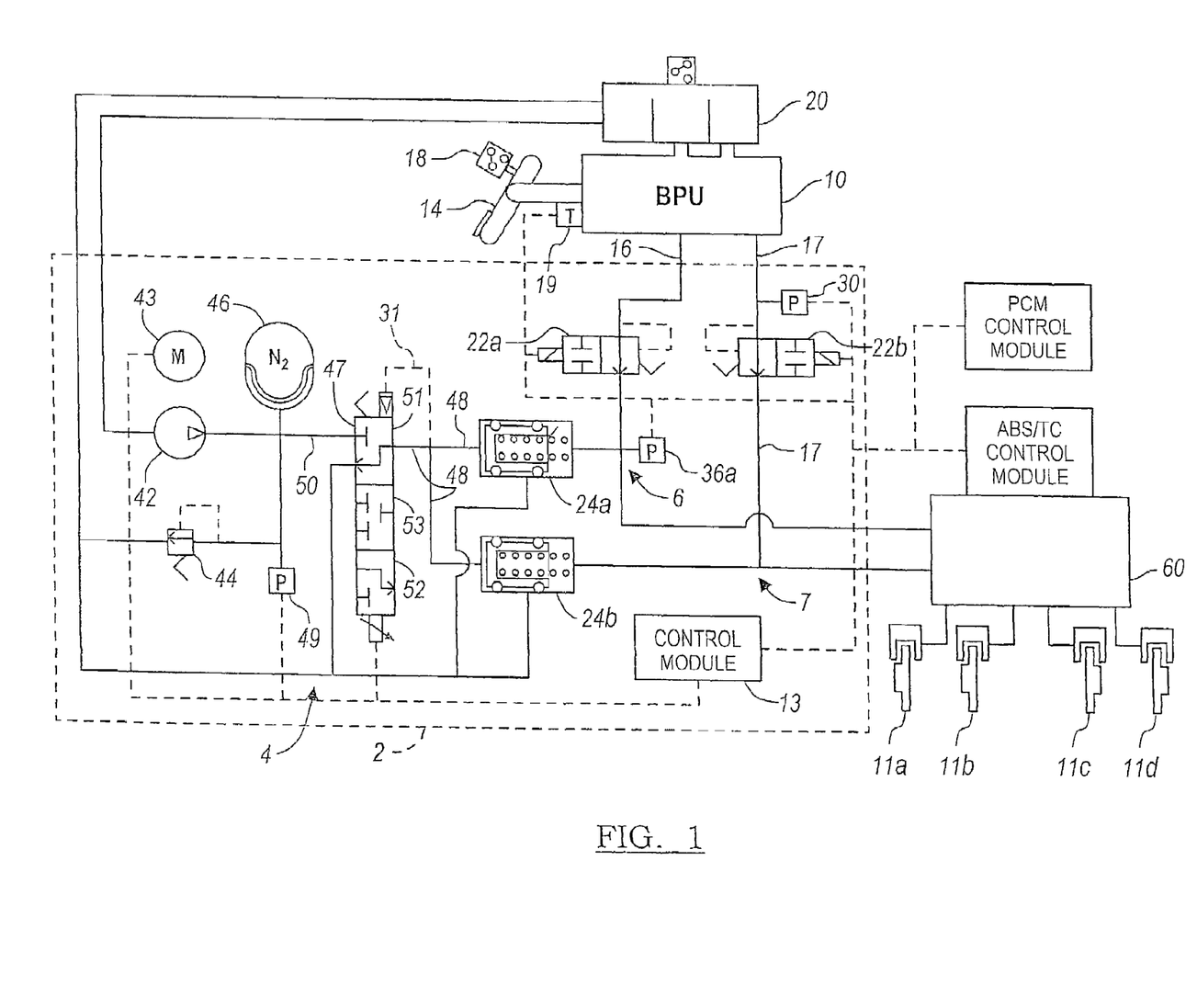
FIG. 1 is a schematic of a brake module utilizing a three-way proportional valve according to a first preferred embodiment of the present invention.

There is shown in FIG. 1, a first embodiment of a vehicle brake module indicated generally at 2, in accordance with the invention. The brake module 2 may suitably be used on a ground vehicle such as an automotive vehicle having four wheels and a brake for each wheel. Furthermore, the brake module 2 may be utilized in coordination with regenerative braking operations. Since electromagnetic force of an electric motor/generator is used in regenerative braking for providing a portion of the braking torque to the vehicle, the braking module 2 must be used in coordination with the regenerative braking portion in applying a remaining amount of brake torque, if necessary, to meet the braking needs of the vehicle. Furthermore, the brake module 2 must cooperate with other types of braking modules of the vehicle such as anti-lock braking and other traction or slip control features to effectively brake the vehicle while simulating a normal response and pedal feel to the operator of the vehicle.

The brake module 2 includes a first circuit of pressurized brake fluid (i.e., a pump circuit), indicated at 4, and a second and a third circuit of pressurized brake fluid (i.e., brake circuits), indicated at 6 and 7 respectively. The first circuit 4 of pressurized brake fluid is used for all braking conditions other than when there is a system failure where manual push through of second circuit 6 and third circuit 7 is utilized. The brake module 2 includes a control module 13, as will be discussed below, for receiving various signals, processing these signals, and controlling the operation of various components of the brake module 2 based on these signals. The control module 13 must effectively communicate with a powertrain control module (PCM) and any other additional braking controllers (such as an ABS/TC control module) of the vehicle to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Thus, the hydraulic braking must effectively and unnoticeably pick up where the electromagnetic braking left off. This not only includes determining and applying the remaining braking torque demand by the operator, but the pedal resistance feedback as well as the vehicle movement should have a smooth transitional change to the hydraulic braking such that the changeover goes unnoticed by the operator of the vehicle. Current braking systems utilize pedal simulation as well as indirect braking methods to actuate vehicle brake actuators (i.e., secondary pressurized braking circuits apply hydraulic pressure to the each vehicle braking unit as opposed to a direct braking circuit from a master cylinder). The present invention illustrates a cost effective and simplified braking circuitry for cooperating with other braking modules within the vehicle for actuating vehicle brake actuators.

Within the brake module 2, the control module 13 causes the first circuit 4 to cooperate with a portion of the hydraulic circuitry of the second circuit 6 and third circuit 7 to provide brake fluid at electronically controlled pressures to four vehicle brake actuators 11*a*, *b*, *c*, and *d*. The vehicle brake actuators 11*a*, *b*, *c*, and *d* each include a respective brake actuation member (such as a slave cylinder) and friction member actuatable by the actuation member for engaging a rotatable braking surface of the vehicle wheel.

The second circuit 6 and third circuit 7 provide for manual backup braking for all four vehicle brake actuators 11*a*, *b*, *c*, and *d*, as will be discussed in detail below. The source of pressurized brake fluid for the second circuit 6 and third circuit 7 is a manually operated master cylinder within the BPU 10. The BPU 10 is operated by a brake pedal 14 to supply pressurized brake fluid to a first manual backup brake circuit via a first conduit 16 and a second manual backup brake circuit via a conduit 17. The BPU 10 preferably includes a tandem master cylinder, having two service pistons, but the master cylinder may be of any suitable design, such as a single piston or triple piston design. In addition, the master cylinder may integrate or work with a pedal simulator unit. The pedal simulator unit includes a plurality of spring loaded pistons, expansion volumes, dampening orifices, and valves which work in cooperation to selectively control the flow of brake fluid to and from the pedal simulator unit to provide a typical brake pedal response during vehicle braking. The brake pedal 14 may be provided with a brake pedal detector 18 to detect the movement of the brake pedal 14. The brake pedal detector 18 may be a switch which actuates the brake lights (not shown), or acts as an input to the control module 13 to indicate that the brake pedal 14 is depressed. The brake pedal 14 is also preferably coupled to a displacement transducer 19 producing a signal indicative of how far the brake pedal 14 is depressed, which is indicative of brake demand by the operator. The signal produced by the displacement transducer 19 is input to the control module 13. A reservoir 20 is provided which communicates with the first, second and third brake circuits through the BPU 10 in the ordinary manner. The reservoir 20 is a triple chamber design, as appropriate, and indeed may have any suitable number of chambers.

The conduit 16 is connected via a first electrically operated isolation valve 22*a* with an anti-lock brake system 60 (other HCU configurations, such as TC or VSC, may optionally be used) for actuating a first set of hydraulically operated vehicle brake actuators 11*a* and 11*b*. The conduit 17 is connected via a second electrically operated isolation valve 22*b* with an ABS unit 60 for actuating second set of hydraulically operated vehicle brake actuators 11*c* and 11*d*. When the isolation valves 22*a* and 22*b* are electrically de-energized, the valves are open, as shown in FIG. 1, allowing pressurized brake fluid from the BPU 10 to be applied to the associated vehicle brake 11*a*, *b*, *c*, and *d* via the ABS unit 60 to brake the vehicle. Under normal braking conditions, the isolation valves 22*a* and 22*b* are energized closed when braking is applied from the first circuit 4 thereby isolating the BPU 10 from the ABS unit 60.

The pressure in conduit 17 between the BPU 10 and the isolation valve 22*b* is monitored by a pressure transducer 30 which supplies a signal representative of the sensed pressure to the control module 13 as a brake demand signal. Note that the signal from the brake pedal displacement transducer 19 may be used instead of the pressure signal from the pressure transducer 30 as the brake demand signal, or may be used in conjunction with the pressure transducer 30.

In the preferred embodiment, the displacement signal from the pedal transducer 19 and the pressure signal from the pressure transducer 30 are both used to create a system brake demand signal. For example, during the first portion of pedal travel, pressure measured by the pressure transducer 30 does not increase greatly compared to the amount of pedal travel. It may be difficult to accurately determine the desired braking demand from the pressure signal produced by the pressure transducer 30, as the increase in the pressure signal may be difficult to differentiate from normal electronic background "noise". Furthermore, forces resulting from friction may also prevent the pressure measured from the pressure transducer from being a single and reliable indicator. Thus, in the first part of pedal travel, the signal from the pedal transducer 19 can be a better indicator of desired braking, and can be given increased weight in determining the brake demand signal. However, in the latter part of the pedal stroke, the pressure monitored by the pressure transducer 30 can change significantly with only a small change in position of a brake pedal 14, and thus a relatively small change in the brake pedal signal produced by the pedal transducer 19. It is in this region that the signal from the pressure transducer 30 may be a more accurate determining factor of the desired braking, and given greater weight in determining the brake demand signal. In an intermediate portion of the pedal stroke, the signal from the pressure transducer 30 and the signal from the pedal transducer 19 can be given equal weight in determining the brake demand signal.

The pressure signal from the pressure transducer 30 is proportional to the force exerted by the driver on the pedal 14. Instead of using a pressure transducer to measure pressure resulting from the force exerted by the driver on the brake pedal 14, it is contemplated that a direct measurement of the force upon the brake pedal 14 may be obtained by use of a strain gauge suitably positioned in the linkage extending from the brake pedal 14 to BPU 10. This measure may be used in developing a brake demand signal instead of the signal from the pressure transducer 30.

As the operator of the vehicle depresses the brake pedal 14, the BPU 10 is actuated, thereby causing an increase in pressure within the conduits 16 and 17. The increased pressure within the conduit 16 provides a force on a pedal simulator (not shown) integrated within the BPU 10. The pressure in conduit 17 is sensed by the pressure transducer 30. The pedal simulator exerts an opposing force on the brake pedal 14 at the appropriate travel so that the operator of the vehicle experiences a normal pedal feel, when the isolation valves 22a and 22b are closed. The purpose of the pedal simulator it is to give the operator the same pedal feel or pedal resistance that the operator would normally feel had the brake pressure been applied directly from a typical master cylinder/booster to the vehicle brake actuators.

The pressure in the conduit 16 between isolation valve 22a and the respective vehicle brake 11a and 11b, is sensed by respective pressure transducer 36a which supply signals representative of the respective sensed pressures to the control module 13. The control module 13 utilizes pressure signals produced by the pressure transducer 36a for purposes which will be described below. The control module 13 also controls the operation of the isolation valves 22a and 22b.

As indicated above, the isolation valves 22a and 22b are energized closed during normal operation of the brake module 2. Only in an abnormal situation, such as a loss of electrical power, will the isolation valves 22a and 22b remain open after the driver initiates a brake demand signal by depressing the brake pedal 14. In such a situation, the BPU 10 acts to supply pressurized brake fluid to the vehicle brake actuators 11a, b, c, and d through the open isolation valves 22a and 22b. An advantage of the present invention is that all vehicle bakes are actuated during manual push through as opposed to only the front vehicle brake actuators. However, absent some type of failure, it is intended that the first circuit 4 should supply pressurized brake fluid for actuating the vehicle brake actuators 11a, b, c, and d.

The first circuit 4 includes a pump 42 for pumping brake fluid from the reservoir 20 to actuate the vehicle brake actuators 11a, b, c, and d. The pump 42 is preferably electrically driven by a motor 43 under the control of the control module 13. However, the pump 42 may be driven by any suitable means, with the output of the pump 42 being controlled by the control module 13. The first circuit 4 is provided with over-pressure protection by a relief valve 44 which opens when a preset pressure is exceeded to direct pressurized brake fluid from the discharge of the pump 42 back to the reservoir 20.

Pressurized brake fluid from the pump 42 is supplied to a high pressure accumulator (HPA) 46 in cooperation with a three-way proportional valve 47. The three-way proportional valve 47, when properly ported, allows brake fluid to flow from the discharge of the pump 42 to the HPA 46. When in a de-energized position 51, a first port is connected to a supply line 50, a first output port is connected each separator unit 24a and 24b, and a second output port is connected to a discharge/return line. The HPA 46 is a diaphragm-type accumulator with a diaphragm made of metal, rubber, plastic, or other elastomer. The diaphragm has a pre-charge of nitrogen acting as a spring element. Other types of suitable gas may be used which have a compressible volume. The pre-charge of nitrogen gas contained in the accumulator 46 biases the diaphragm toward the brake fluid connection of the accumulator 46. Of course, any suitable accumulator design may be used, and the accumulator 46 need not be of the diaphragm-type design depicted. For example, the accumulator 46 may be a bladder or a piston-driven accumulator. The accumulators are sized according to the actual brake fluid volume when all the brake fluid is discharged. The available volume of brake fluid for a given accumulator depends directly from the amount of compressible gas available to discharge it from the accumulator, known as working volume. The working volume varies as the pressure and temperature of the compressible gas varies. Thus rate of charge and discharge need to be considered when sizing the accumulator.

As pressurized brake fluid flows into the HPA 46 through the fluid connection, the diaphragm of the HPA 46 is moved to further compress the nitrogen gas precharge. In this condition, the HPA 46 contains a reservoir of brake fluid which is pressurized by the diaphragm under the influence of the compressed nitrogen gas, which may be used to assist in actuating the vehicle brake actuators 11a, b, c, and d whether or not the pump 42 is running. The pressure of the brake fluid in the HPA 46 is sensed by a pressure transducer 49, which supplies a corresponding signal to the control module 13.

The three-way proportional valve 47 is controlled by the control module 13. At the de-energized position 51, shown in FIG. 1, the pressurized brake fluid in the accumulator 46 is prevented from discharging from the HPA 46. Note that a pressure relief valve 44 cooperates with the three-way proportional valve 47 to prevent the fluid within the accumulator 46 from discharging when the three-way proportional valve 47 is at a de-energized position 51. The pressure relief valve 44 discharges the brake fluid from the HPA 46 during instances when the pressure of the brake fluid in the HPA 46 is too high. When braking is required, the three-way proportional valve 47 is energized to a second position 52 to allow the pressurized brake fluid in the accumulator 46 to flow to the fluid separator units 24a and 24b for actuating the vehicle brake actuators 11a, b, c, and d. The illustrated proportional control valve 47 includes the first output port which is in fluid communication with a fluid separator unit 24a and 24b. The fluid separator unit 24a has the same structure and functionality as the fluid separator unit 24b. The fluid separator units 24a and 24b each includes a housing with a cylindrical bore therethrough. A first end of each bore is in fluid communication with the proportional control valve 47. A second end of each bore of the fluid separator units 24*a* and 24*b* is in fluid communication with the vehicle brake 11*a, b* and 11*c, d*, respectively.

A fluid separator piston is slideably disposed within each cylindrical bore between each first end and each second end. Each piston is generally cylindrical, having a first piston face in fluid communication with the first circuit 4 via each first end of each bore and a second piston face in fluid communication with the second circuit 6 and third circuit 7 via each second end of the each bore. Seals are disposed in each piston and oriented to slidingly seal between each piston and the wall of bore. It will be appreciated that the diameter of each piston is the same on both ends of each piston so that a cross-sectional area of the first working face of the piston (the area acted upon by the adjacent volume of brake fluid) is the same as the cross-sectional area of the second working face of the piston. These features of the invention are believed to simplify construction of the fluid separator unit and reduce costs compared to a possible alternate construction having a stepped bore and stepped piston sliding therein.

In the fluid separator units 24*a* and 24*b*, pressurized fluid from the primary source 4 actuates each piston of fluid separator units 24*a* and 24*b* to pressurize trapped brake fluid between isolation valves 22*a* and 22*b* and vehicle brake actuators 11*a, b, c*, and *d* (via the ABS unit 60) to substantially the same pressure as the pressure at which the brake fluid is supplied to the fluid separator units 24*a* and 24*b* from the first circuit 4. Any differences due to the compression of internal components such as compression springs within each fluid separator unit 24*a* and 24*b* and friction are generally negligible fractions of the pressures of the brake fluid acting in each fluid separator unit 24*a* and 24*b* during braking.

The fluid separator units 24*a* and 24*b* permit pressure of the brake fluid on one side of each piston (acting on one of the first and second working faces of each piston) to be transferred to the brake fluid on the other side of the fluid separator piston (acting on the other of the first and second working faces of each piston) through movement of each fluid separator piston within each bore. The fluid separator units 24*a* and 24*b* are sealed to the wall of each bore by seals to prevent intermixing of the brake fluids on either side of each piston. As will become apparent, a primary purpose of the fluid separator unit 24*a* (and of the fluid separator unit 24*b*) is to maintain the integrity and operability of the second circuit 6 and third circuit 7 of brake fluid even in the event of a malfunction or rupture of the first circuit 4.

A spring within each fluid separator unit 24*a* and 24*b* biases each fluid separator piston toward an unactuated position. Each fluid separator piston is constrained to remain in each bore and thus a complete loss of brake fluid and pressure on one side of each fluid separator piston of each the fluid separator unit 24*a* and 24*b* will not result in loss of fluid or complete loss of pressure on the other side of each fluid separator piston. As pressurized brake fluid flows into each fluid separator unit 24*a* and 24*b* from the proportional control valve 47, each fluid separator piston is moved to an actuated position, compressing each compression spring. Each piston acts on the brake fluid in the second end of each bore, thereby pressurizing the brake fluid trapped between the energized isolation valve 22*a* and 22*b* and the vehicle brake 11*a, b, c*, and *d* causing the vehicle brake 11*a, b, c*, and *d* to be applied.

The three-way proportional control valve 47 is electrically positioned by the control module 13. In a de-energized position 51, the release position, the spool of the proportional control valve 47 is moved by a spring to the position illustrated in FIG. 1, where the proportional control valve 47 provides fluid communication between the associated fluid separator unit 24*a* and 24*b* and the reservoir 20 via a conduit 49. This vents pressure from the fluid separator units 24*a* or 24*b*, allowing the piston thereof to move back to the unactuated position under the urging of the associated spring, thereby reducing pressure at the associated vehicle brake 11*a, b, c*, and *d*. In a second energized position 52, the apply position, the proportional control valve 47 directs the pressurized brake fluid supplied to the proportional control valve 47 from a conduit 50 to the associated fluid separator unit 24*a* or 24*b*. In a first energized position 53, the maintain position, the proportional control valve 47 closes off the port thereof which is in communication with the associated fluid separator unit 24*a* and 24*b*, thereby hydraulically locking the associated fluid separator piston of the fluid separator unit 24*a* and 24*b* in a selected position. The pressures in the conduits between proportional control valve 47, and the vehicle brake actuators 11*a, b, c*, and *d* are sensed by a respective pressure transducers 36*a* which supply signals representative of the respective sensed pressures to the control module 13.

Preferably, the positions of the proportional control valves 47 are controlled so that the controlled pressures are proportional to the current of the energizing electrical signal. The controlled pressure for the proportional control valves 47 is the fluid pressure in the conduit between the proportional control valve 47 and the fluid separator units 24*a* or 24*b*. A respective pressure feedback conduit 31 is provided to the proportional control valve 47 so that controlled pressure opposes the movement caused in the proportional control valve 47 caused by increasing energization of the solenoid thereof.

It may be desirable, however, to control the position of the proportional control valves 47 such that the exact position of a proportional control valve 47 is proportional to the energizing electrical signal from the control module 13. Thus, the proportional control valves 47 may be positioned at an infinite number of positions rather than just the three positions described above. In other words, the proportional valves 47 may be positioned in the apply position, the maintain position, or the release position; the proportional valves 47 may also be positioned to any position between the apply and maintain position to provide a throttled path for directing the pressurized brake fluid to each fluid separator unit 24*a* and 24*b*, and the proportional valves 47 may be positioned to any position between the release position and the maintain position to provide a throttled path for venting the pressurized brake fluid from each fluid separator unit 24*a* and 24*b* to the reservoir 20. If it is desired to rapidly apply pressurized brake fluid to the vehicle brake actuators 11*a, b, c*, or *d*, the proportional control valve 47 is moved fully to the first energized position 52. However, if it is desired to more slowly apply brake fluid to the vehicle brake actuators 11*a, b, c*, or *d*, the proportional control valve 47 is moved to a position between the second energized position 52 (apply) and a first energized position 53 (maintain), so that pressurized brake fluid can be applied to the vehicle brake actuators 11*a, b, c*, or *d* at less than the maximum rate possible. Similarly, the proportional control valve 47 may be moved to a position between the first energized position 53 (maintain) and the de-energized position 51 (release) to vent pressurized brake fluid from the vehicle brake actuators 11*a, b, c*, and *d* at less than the rate possible when the proportional control valve 47 is in the de-energized position 51 (release).

For general operation of the brake module 2 during normal braking, the control module 13 maintains the isolation valves 22a and 22b energized thereby isolating the BPU 10 from the ABS unit 60 and vehicle brake actuators 11a, b, c, and d, while hydraulically connecting the pedal simulator to the BPU 10. Fixed volumes of brake fluid are trapped between the isolation valve 22a and 22b and the vehicle brake actuators 11a, 11b, and 11c, 11d, respectively. The pump 42 is suitably run to cooperate with the accumulator 46 to supply sufficient quantities of pressurized brake fluid to meet the brake demand. Generally, the pump 42 is shut off by the control module 13 when a sufficient quantity of suitably pressurized brake fluid has been generated to meet brake demand. In this manner, the conduit 50 is pressurized for supplying fluid to the proportional control valve 47.

The pressure transducer 49 monitors the pressure in the HPA 46 and the conduit 50 providing input to the control module 13. The control module 13 controls the operation of the pump 42 as needed to maintain pressure of the brake fluid of the first circuit 4. Suitably the control module 13 may be designed to alert the vehicle operator if the pressure response is not as expected.

In the event that an abnormal loss of pressure in the first circuit 4, or other failure of the first circuit 4, the control module 13 monitors the pressure transducer 30, 36a, and 49 to attempt to determine the extent of the abnormality. Pre-programmed degraded control schemes are preferably programmed into the control module 13. As will be discussed below, the control module 13 may maintain braking control from the first circuit 4 in certain degraded conditions. In certain other conditions, the control module 13 may cause pressurized brake fluid for operation of the vehicle brake actuators 11a, b, c, and d to be supplied from the manual second circuit 6 and third circuit 7, from the BPU 10. In this case, the isolation valves 22a and 22b, the proportional control valves 47 are de-energized, thereby connecting the vehicle brake actuators 11a, b, c, and d to the BPU 10 for manual control. Note that even a rupture of the conduit 50 of the first circuit 4, and a complete draining of brake fluid from the first circuit 4, will not prevent the operation of the vehicle brake actuators 11a, b, c, and d by the BPU 10, since the fluid separator units 24a and 24b will prevent any loss of brake fluid from conduit 16 or conduit 17 of the second circuit 6 and third circuit 7 to the first circuit 4.

Various automated brake demand signals and brake modulation signals may be supplied to the control module 13. Various secondary additional braking modules may be integrated into the vehicle such as regenerative braking systems, anti-lock braking systems (ABS), traction control, coordinated vehicle stability control, hill hold, automated collision avoidance, or automated cruise control. Thus, it may be desired to actuate one or more of the vehicle brake actuators 11a, b, c, and d for these purposes even when the vehicle operator is not depressing the brake pedal 14. Similarly, it may be desired to temporarily decrease the braking force of one or more of the vehicle brake actuators 11a, b, c, and d, individually or in cooperation, for the purposes of antilock braking even if the operator is depressing the brake pedal 14. Signals which may be supplied to the control module 13 for the purposes of such automated control schemes may include wheel speed of each of the vehicle's wheels, vehicle deceleration, steering angle, vehicle yaw rate, vehicle speed, vehicle roll rate, and signals from radar, infrared, ultrasonic, or similar collision avoidance systems, cruise control systems (including AICC-Autonomous Intelligent Cruise Control Systems), and the like. It may also be desirable to actuate one or more of the vehicle brake actuators 11a, b, c, and d for purposes of panic brake assist when the vehicle operator is depressing the brake pedal 14. The control module 13 will actively communicate with a second control module of a secondary braking system to determine a braking strategy and to work in coordination between both systems. Alternatively, control module 13 may be incorporated into the second control module of the secondary braking system to reduce complexity of components and the need for two separate control modules.

By reducing the number of three-way proportional valves and pressure sensors required to sense pressure at each proportional valve, the cost and complexity of the modular braking unit is thereby reduced. Furthermore, because of the reduction of the number of electrical devices used in the modular braking unit, less energy will be required to maintain operation of the electrical devices which is productive when using regenerative braking. Moreover, the above modular braking unit is compatible with regenerative braking and low cost conventional modular slip control HCU's.

Figure 2:
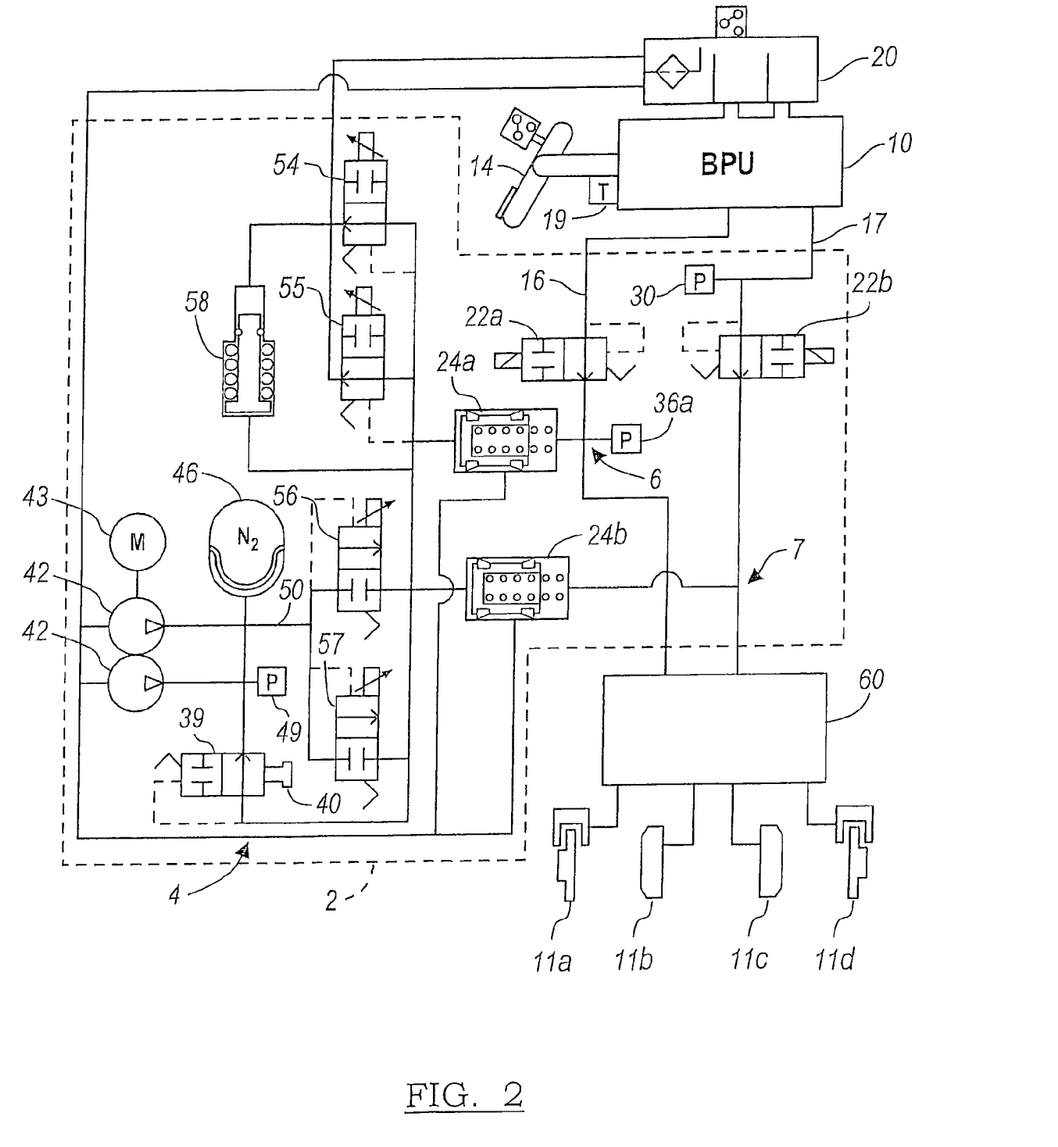
FIG. 2 is schematic of a brake module utilizing a plurality of two-way proportional valves according to a second preferred embodiment of the present invention.

FIG. 2 illustrates a second preferred embodiment of a modular braking unit according to the present invention, wherein the three-way proportional valve 47 of FIG. 1 is replaced with four two-way proportional valves. Two two-way normally open (N/O) valves 54 and 55 are ported between the fluid separators 24a and 24b and the reservoir 20 to vent pressurized brake fluid from the fluid separator units 24a and 24b. When energized to the closed position, N/O proportional valves 54 and 55 restrict the flow of the brake fluid to the reservoir 20. Two two-way normally closed (N/C) valves 56 and 57 are ported between the fluid separators 24a and 24b and the HPA 46. When closed, N/C proportional valves 56 and 57 restrict the flow of brake fluid from the pump 42 or HPA 46 to the fluid separation units 24a and 24b. When open, the brake fluid of the first circuit 4 is provided to each fluid separator unit 24a and 24b. A bleed valve 39 cooperates with the N/C proportional valves 56 and 57 to prevent the fluid within the accumulator 46 from discharging when the N/C proportional valves 56 and 57 are de-energized closed. The bleed valve 39 includes a provision for being manually opened. Prior to filling the modular braking unit with braking fluid at the assembly plant, solenoid valves are commonly required to be energized while air is evacuated from the conduits. The bleed valve 39 is held in the open position to allow the modular braking unit to be purged of air without having to energize any of the valves.

N/O proportional valves 54 and 55 and N/C proportional valves 56 and 57 operate in cooperation with one another to apply and release pressurized brake fluid to and from fluid separation units 24a and 24b to actuate the vehicle brake actuators 11a, b, c, and d. For example, control module 13 receives a signal that the brakes are being applied by the operator. N/C proportional valves 56 and 57 are energized to the open position so that pressurized brake fluid is allowed to flow to the fluid separation units 24a and 24b. N/C proportional valves 54 and 55 are energized to the closed position so that the pressurized brake fluid of the first circuit 4 is not allowed to flow to the reservoir 20. Pressurized brake fluid is therefore exerted against each piston within each fluid separator unit 24a and 24b to actuate vehicle brake actuators 11a, b, c, and d. If the control module 13 receives a signal that a constant braking force is being maintained by the operator, then both the N/O proportional valves 54 and 55 are energized closed as well as the N/C proportional valves 56 and 57 (de-energized to close), thereby hydraulically locking the associated fluid separator piston of each fluid separator 24a and 24b in a selected position. If the pressurized brake fluid is to be relieved from the fluid separators 24*a* and 24*b*, which in turn reduces pressure at the associated vehicle brake actuators 11*a*, *b*, *c*, and *d*, the N/O proportional valves 54 and 55 are de-energized to the open position and the N/C proportional valves are de-energized to the closed position to allow the pressurized brake fluid to return to the reservoir 20. This embodiment allows less expensive proportional valves to be utilized which further reduces the cost of a conventional modular braking unit. In other preferred embodiments, a single pair of N/O and N/C valves could be utilized as well as three or more sets of parallel N/O or N/C valves.

If an anti-lock braking (ABS) module 60 is used in coordination with the braking module 2, the two braking modules may be susceptible to differential closing between valves of the ABS module 60 and valves of the brake module 2. When the ABS module 60 is activated, the system pulses one or more vehicle brake actuators for preventing wheel lockup or for braking on slippery road surfaces. The N/O proportional valves 54 and 55 must actuate in cooperation with the valves of the ABS module 60 to rapidly increase, decrease, or maintain pressure for antilock braking. Because of the rapid opening and closing of the ABS valves which may be milliseconds, the N/O proportional valves 54 and 55 may not be able to receive control signals and react fast enough to maintain simultaneous opening and closing with the ABS valves. As a result, valves of the ABS module 60 may be attempting to apply pressurized braking fluid to the wheels but the N/C valves of the brake module 2 are closed. Improperly timed valve actuation may lead to inadequate or excessive pressure in conduits of the first circuit 4 or the second circuit 6 and third circuit 7. To compensate for this pressure error, a compliance accumulator 58 is disposed between the fluid separation valves 24*a* and 24*b* and the reservoir 20 and in parallel with the N/O proportional valves 54 and 55. The compliance accumulator 58 functions as an accumulator at boost valve controlled pressure to help maintain the desired pressure exerted within the first circuit 4 by minimizing pressure disturbances caused by the differential actuation between the opening of the valves of the ABS module 60 and the N/C proportional valves 56 and 57. The compliance accumulator also helps maintain the desired boost pressure when the ABS pumps force fluctuating flow through the N/O proportional valves. A compliance accumulator piston is loaded over a wide range of spring force to allow the pressurized brake fluid to flow into the compliance accumulator 58 over the full range of controlled boost pressure.

Figure 3:
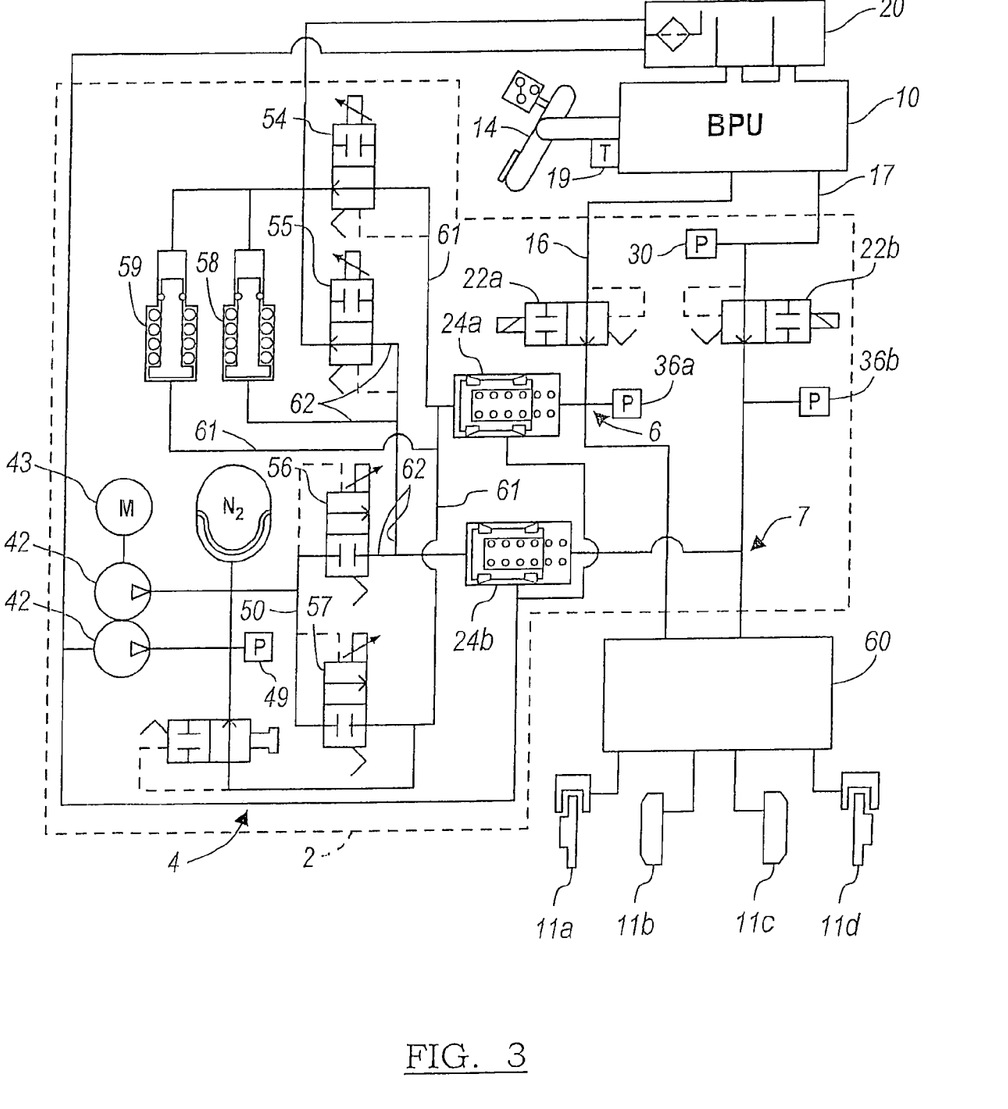
FIG. 3 is a schematic of a brake module utilizing a plurality of two-way proportional valves for controlling two brake circuits according to a third preferred embodiment of the present invention.

Referring to FIG. 3, two brake circuits (i.e., conduit 16 and 17) are each independently controlled by a respective fluid separator unit. This allows the brake module 2 to provide different controlled pressures in the two brake circuits. N/C proportional valve 56 provides brake fluid via conduit 62 to fluid separator unit 24*a*. N/O proportional valve 55 is connected to fluid separator unit 24*b* via conduit 62 for relieving pressurized brake fluid from said fluid separator unit 24*b*. Furthermore, pressurized brake fluid is provided from N/C proportional valve 57 to fluid separator unit 24*a* via conduit 61. N/O proportional valve 54 is connected to fluid separator unit 24*a* via conduit 61 for relieving pressurized hydraulic fluid from said fluid separator unit 24*a*. Conduits 61 and 62 are separate and distinct from each other such that pressurized brake fluid within conduit 61 applies pressure only to fluid separator unit 24*a* and pressurized brake fluid within conduit 62 applies pressure only to fluid separator unit 24*b*. Since fluid separator units 24*a* and 24*b* are actuated independently, this allows separate control of two brake circuits. As a result, fluid separator unit 24*a* applies pressurized brake fluid to actuate vehicle brake actuators 11*a* and 11*b*. Fluid separator 24*b* applies pressurized brake fluid to actuate vehicle brake actuators 11*c* and 11*d*. Since the two brake circuits are independently actuated, a pressure transducer 36*b* is connected to conduit 17 after the isolation valve 22*b* for sensing and supplying signals representative of the respective sensed pressures to the control module 13.

Since the each brake circuit is independently controlled, two compliance accumulators are required to reduce controlled pressure error that may be present between a set of actuated ABS valves and an associated N/C proportional valve. Compliance accumulator 58 is disposed within conduit 62 for controlling pressure exerted during ABS activation of vehicle brake actuators 11*a* and 11*b*.

A second compliance accumulator 59 is disposed within conduit 61 to control the pressure exerted during ABS activation of vehicle brake actuators 11*a* and 11*b*.

Figure 4:
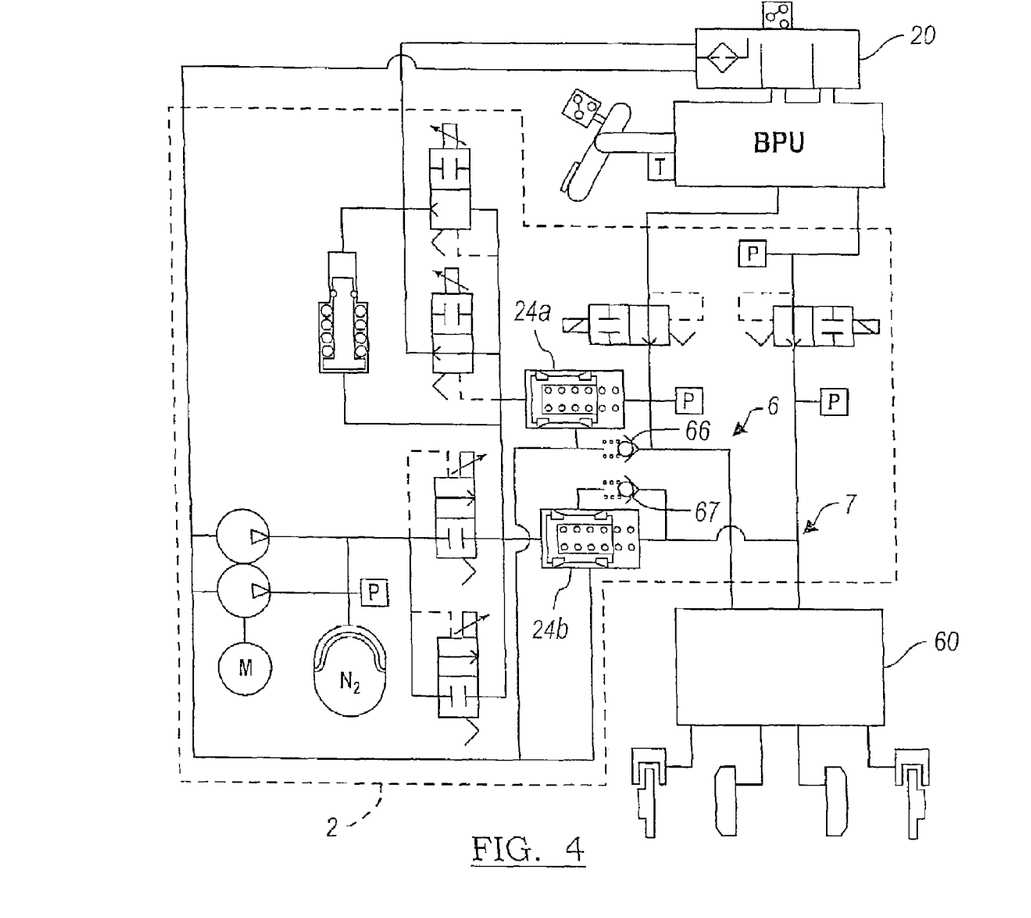
FIG. 4 is a schematic of a brake module utilizing relief valves for over-pressurization according to a fourth preferred embodiment of the present invention.

Referring to FIG. 4, an embodiment is shown for alleviating over-pressurization as a result of excess fluid (i.e., possibly due to leakage from the isolation valve 22*a* or 22*b*) being pumped from the ABS module 60 into a respective fluid separator after the piston within the respective fluid separator reaches a mechanical stop. During normal braking operations, the first circuit 4 provides the pressurized brake fluid to act on the first and second separation units 24*a* and 24*b* which in turn pressurizes the brake fluid of the second circuit 6 and third circuit 7 for actuating vehicle brake actuators. Manual push through of the second circuit 6 and third circuit 7 is only utilized as a failsafe condition wherein the first circuit 4 is inoperable or leakage of pressurized brake fluid from the first circuit 4 has occurred. Until one or more of these conditions occur wherein manual push through would be required, the isolation valves 22*a* and 22*b* maintain the separation of pressurized brake fluid between each isolation valve and the BPU 10 when braking is demanded. However, it is possible that brake fluid may leak past the isolation valves 22*a* and 22*b* undetected, or that excess brake fluid remains in a brake or LPA when these valves are closed. If valves 22*a* and 22*b* are closed with the fluid separator pistons fully retracted and there is residual fluid in the brakes or LPA's (possibly from a previous manual brake apply), then a potential over-pressure condition exists. Running ABS pumps (not shown) with ABS isolation valves closed (not shown) can dead-head the ABS pumps, causing significantly high pressures to damage components/seals if high pressure relief is not provided. This condition can occur in one or both braking circuits.

FIG. 4 is a schematic illustration incorporating pressure relief valves to avoid over-pressurization in the second circuit 6 and the third circuit 7. The second circuit 6 is provided with a relief valve 66 for over-pressure protection of conduit 16 which opens when a preset pressure is exceeded to direct pressurized brake fluid of the second circuit 6 to the reservoir 20. The relief valve 66 is disposed in parallel with the fluid separation unit 24*a*. The third circuit 7 is further provided with a relief valve 67 for over-pressure protection of conduit 17 and is disposed in parallel with the fluid separation unit 24*b* and functions in a same manner as relief valve 66.

Figure 5:
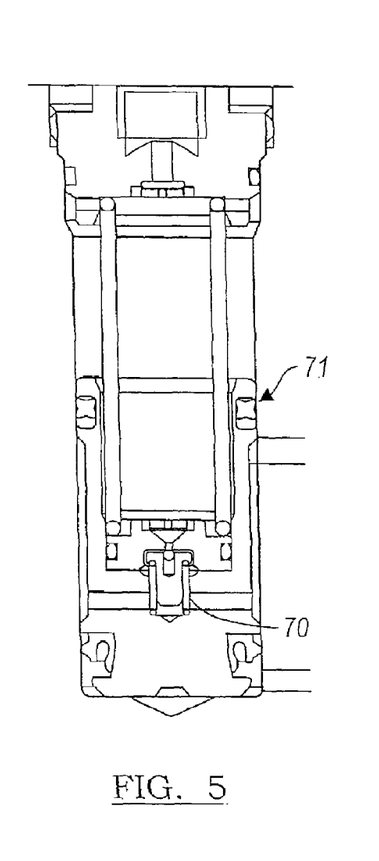
FIG. 5 is an illustration of a fluid separator unit integrating a relief valve according to the present invention.

FIG. 5 illustrates an integrated relief valve 70 which may be integrated within a respective separator unit 71 to relieve over-pressurization of the second or third circuit according to another preferred embodiment. When pressurized brake fluid exceeds the preset pressure of the relief valve 70, the pressurized brake fluid exerts a force on a first end of the relief valve 70 forcing the relief valve further into a cylindrical chamber of the separator unit 71. Displacing the relief valve 70 opens a passage that allows the pressurized brake fluid to flow into the fluidic conduit between the dynamic seals on a separator piston (reservoir pressure). When the pressure exerted on the relief valve 70 decreases below the preset pressure, the relief valve 70 will close thereby blocking the flow of pressurized hydraulic fluid from entering the passage.

Figure 6:
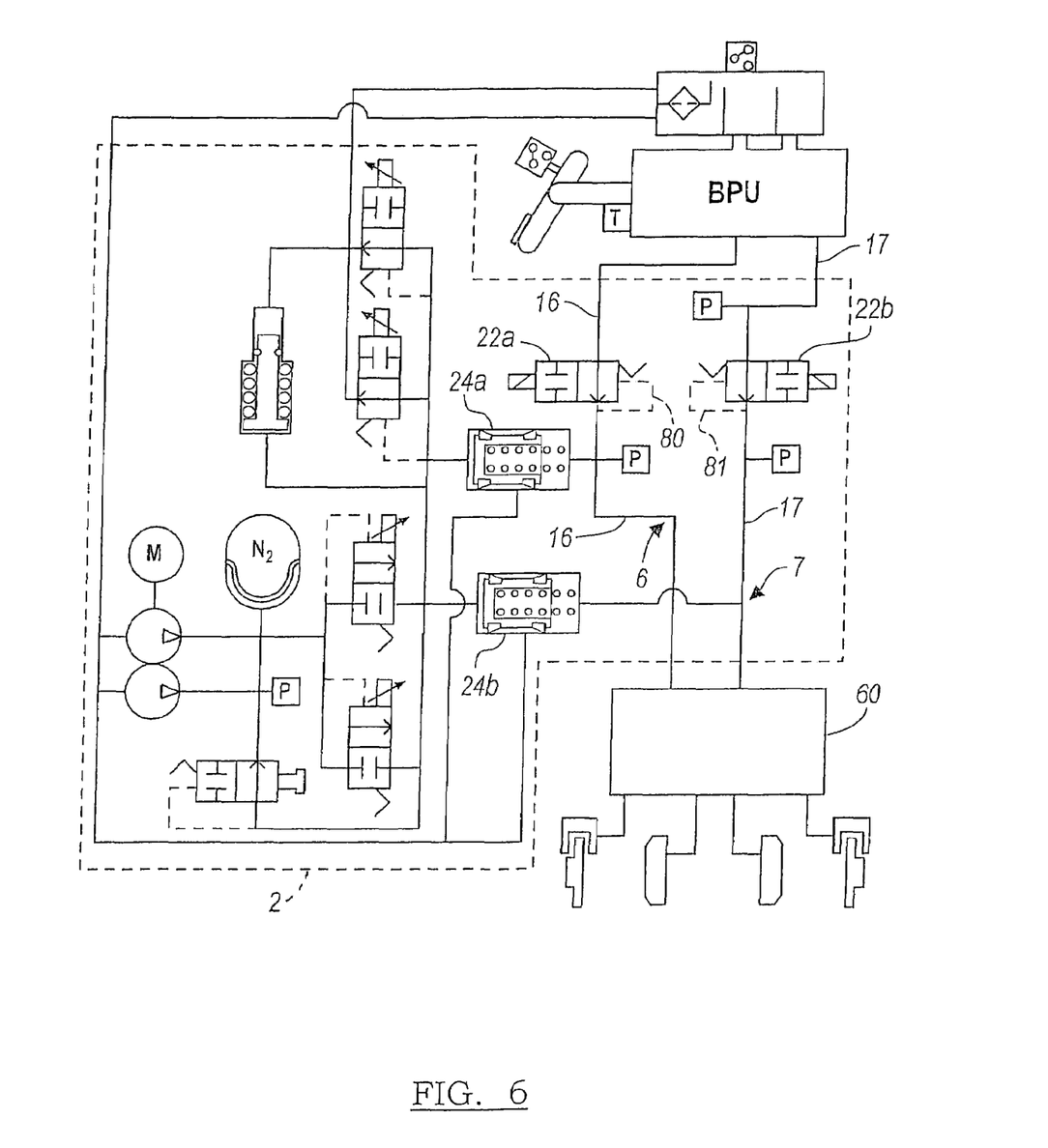
FIG. 6 is a schematic of a brake module utilizing isolation valves ported as relief valves according to a fifth preferred embodiment of the present invention.

FIG. 6 illustrates a pair of two-way valves for relieving over-pressurization within the second circuit 6 and third circuit 7 according to yet another preferred embodiment. A first two-way valve 22a and a second two-way valve 22b each includes a pilot line 80 and 81. During normal braking operation, both two-way valves 22a and 22b are energized (i.e., closed) so that each isolation valve maintains pressure along conduits 16 and 17. Each pilot line is disposed to open a respective two-way valve to a de-energized position if an over-pressurization condition occurs in the second circuit 6 and the third circuit 7 between isolation valves 22a and 22b and the ABS module 60 (as with the other embodiments, additional or fewer slip control functions other than both ABS and TC may be included) while each isolation valve is energized. The pressure developed in each pilot line (i.e., delta above MC pressure) exerts a force opposite the direction of a solenoid in each isolation valve. When the pressure in each pilot line exceeds a force of its respective solenoid, the over-pressurization within the each pilot line will force the respective isolation valve to the de-energized position thereby allowing the over-pressurized brake fluid to flow back to the BPU 10 thereby relieving the over-pressurization condition of the second circuit 6 and third circuit 7. When the pressurized hydraulic fluid in each pilot line drops below the preset force of each respective isolation valve solenoid, the valve will close to maintain a delta pressure.

Figure 7:
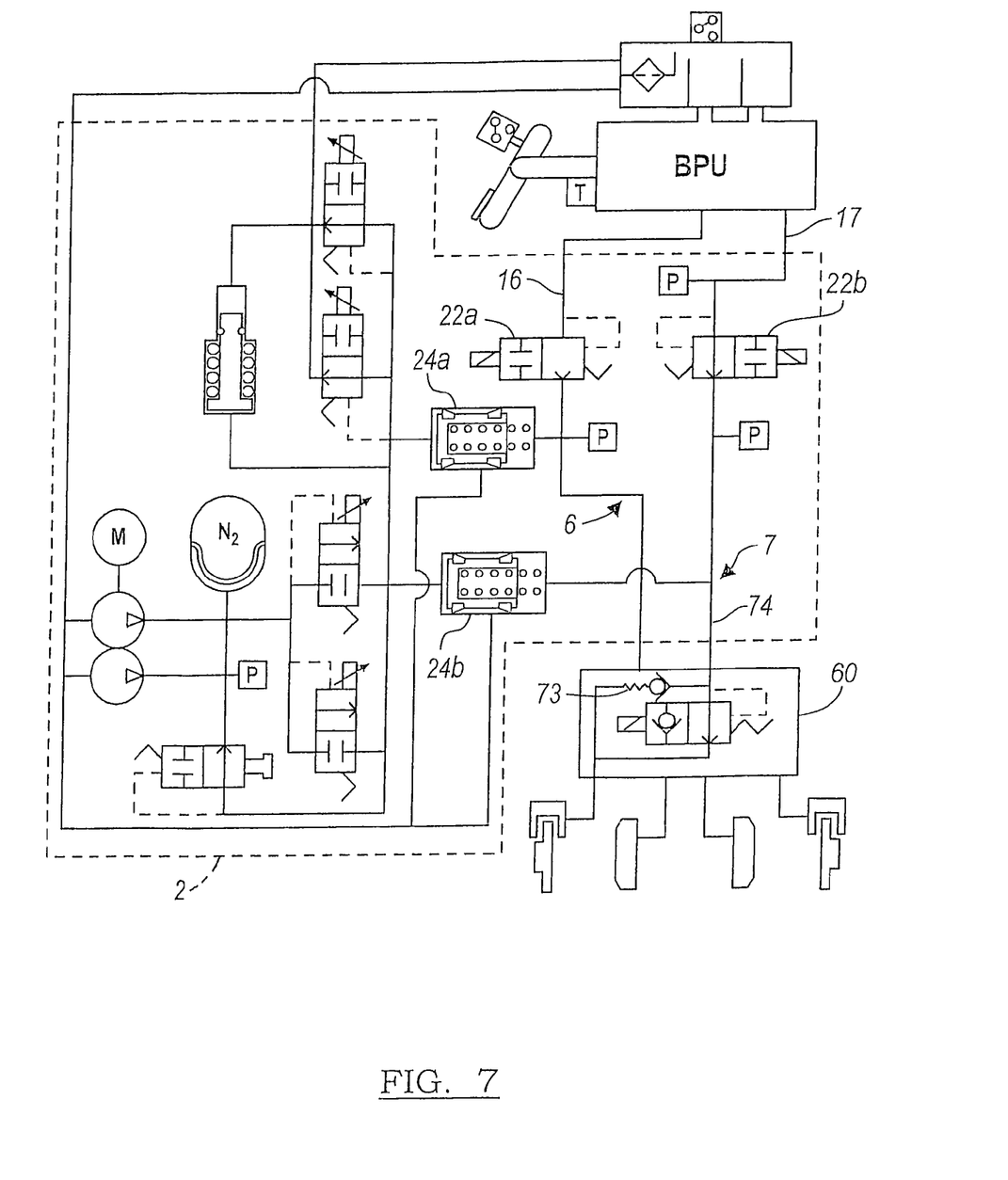
FIG. 7 is a schematic of a brake module and an ABS module incorporating a relief valve for over-pressurization according to a sixth preferred embodiment of the present invention.

Referring to FIG. 7, a schematic is shown incorporating a pressure relief valve 73 in the ABS module 60. The ABS module 60 as depicted illustrates only those components required to provide pressure relief for the braking system and does not show or describe the internal fluidic components required to operate ABS functionality. The pressure relief valve 73 is integrated into conduit 74 of the ABS module 60 for relieving the over-pressurized brake fluid of the second circuit 6. A two-way valve 75 is disposed within conduit 74 to allow pressurized brake fluid to actuate one of the vehicle brake actuators. The two-way valve 75 is de-energized when allowing bi-directional flow of pressurized brake fluid to a respective vehicle brake for vehicle braking. The relief valve 73 is in parallel with the two-way valve 75. If over-pressurization occurs while the two-valve is in the energized position (i.e., closed/one way flow position), the relief valve 73 will open when a preset pressure differential is exceeded and dump the pressurized brake fluid directly to the brakes to relieve pressure in conduit 74. Each of the vehicle brake actuators may include a two-way valve with the relief valve for dumping over-pressurized brake fluid to a respective brake. Furthermore, a LPA may be used to store the excess brake fluid as opposed to dumping the excess brake fluid to the respective vehicle brake.

Figure 8:
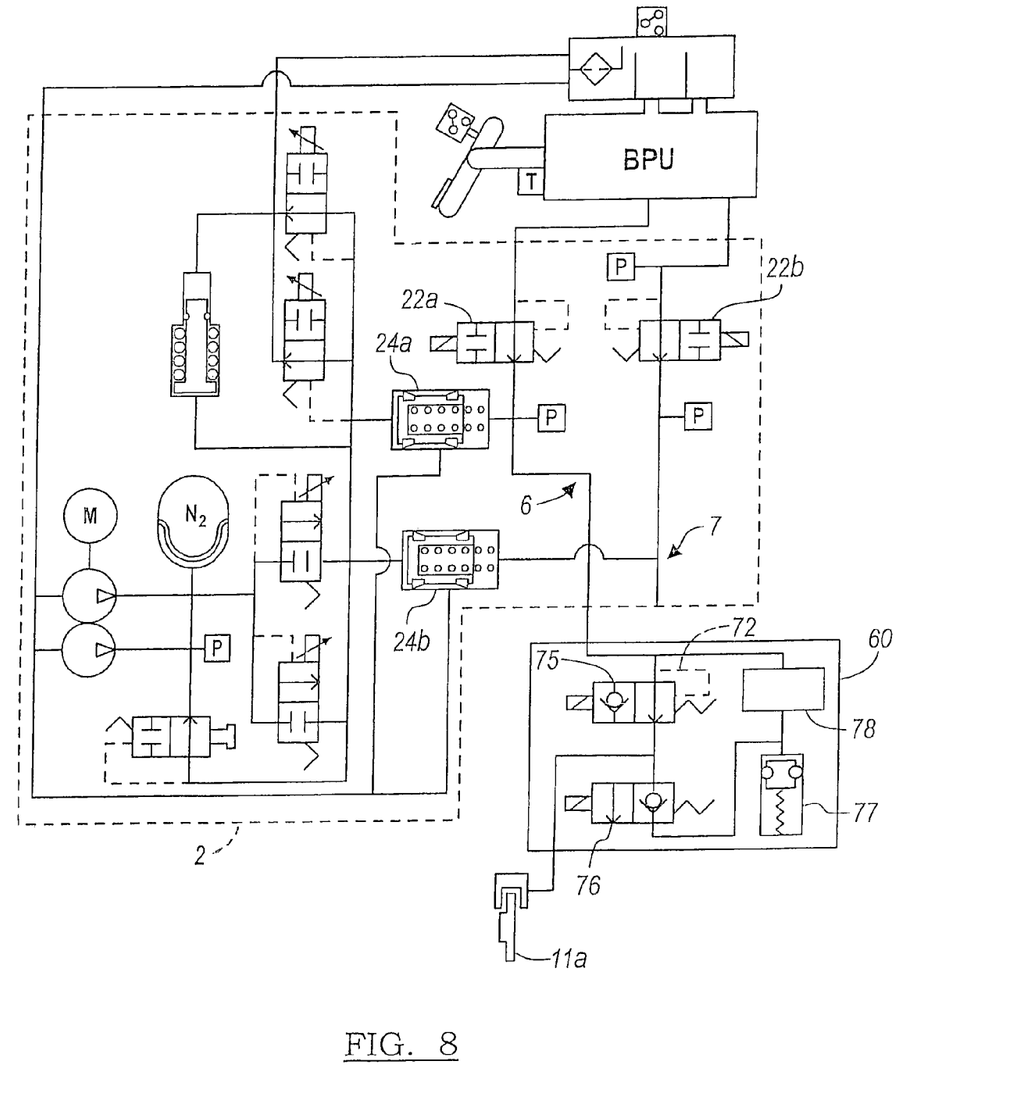
FIG. 8 is a schematic of a brake module and the ABS module utilizing isolation valves for over-pressurization according to a seventh preferred embodiment of the present invention.

Referring to FIG. 8, a schematic is shown utilizing isolation valves of ABS module 60 to provide pressure relief. The ABS module 60 illustrates only those components required to provide pressure relief for the braking system and does not show or describe the internal fluidic components of an ABS system. Integrated within the ABS module 60 is a first isolation valve 75. The first isolation valve 75 is ported so when in the de-energized position, bi-directional flow of pressurized brake fluid is permitted to actuate one or more of the vehicle brake actuators. When in the energized position, the first isolation valve 75 prevents any additional pressurized brake fluid from flowing to first brake actuator 11a. A dump valve 76, when in the de-energized position, is ported so as to maintain pressurized brake fluid to the first brake actuator 11a when braking is occurring. When energized, the dump valve 76 alleviates the pressurized brake fluid from the first brake actuator 11a. The pressurized brake fluid flowing from the isolation valve 75 is directed back to fluid circuit 78 which includes the ABS valves, motors, pumps, and other hydraulic components required to operate the ABS module 60. Alternatively, the released pressurized brake fluid may be stored in a first low pressure accumulator (LPA) 77 until it is released to the fluid circuit 78. The ABS pump (not shown) within circuit 78 pumps the brake fluid stored in the first LPA 77 to the second circuit 6. If the additional brake fluid sent to circuit 6 via the ABS pump cannot be absorbed by the fluid separator unit 24a, then over-pressurization of brake fluid within circuit 6 will occur. The first isolation valve 75 is controlled to open at a certain pressure differential and the first dump valve 76 energized to allow brake fluid to flow back into the first LPA 77 for storage. This flow of pressurized brake fluid will flow in this loop to and from the first LPA 77 whenever over-pressurization is present and additional volume is required for the storage of additional brake fluid. In addition, brake fluid within the first LPA 77 may be released back to the first brake actuator 11a as opposed to pumping brake fluid back to the second circuit 6 when the first vehicle brake actuator pressure is below the pressure of the first LPA 77.

The isolation valve 75 may include a pilot line 72 such that if over-pressurization of the brake fluid occurs in the second circuit 6 between isolation valve 22b and the ABS module 60 while the first isolation valve 75 is energized, then the pressure exerted in the pilot line 72 will force the isolation valve 75 to the de-energized position to relieve the pressure from the second circuit 6. Depending upon the position of the dump valve 76, the pressurized brake fluid will drain into the first brake actuator 11a (i.e., dump valve 76 closed) or into the LPA 77 (i.e., dump valve 76 open), if the LPA 77 is provided.

Figure 9:
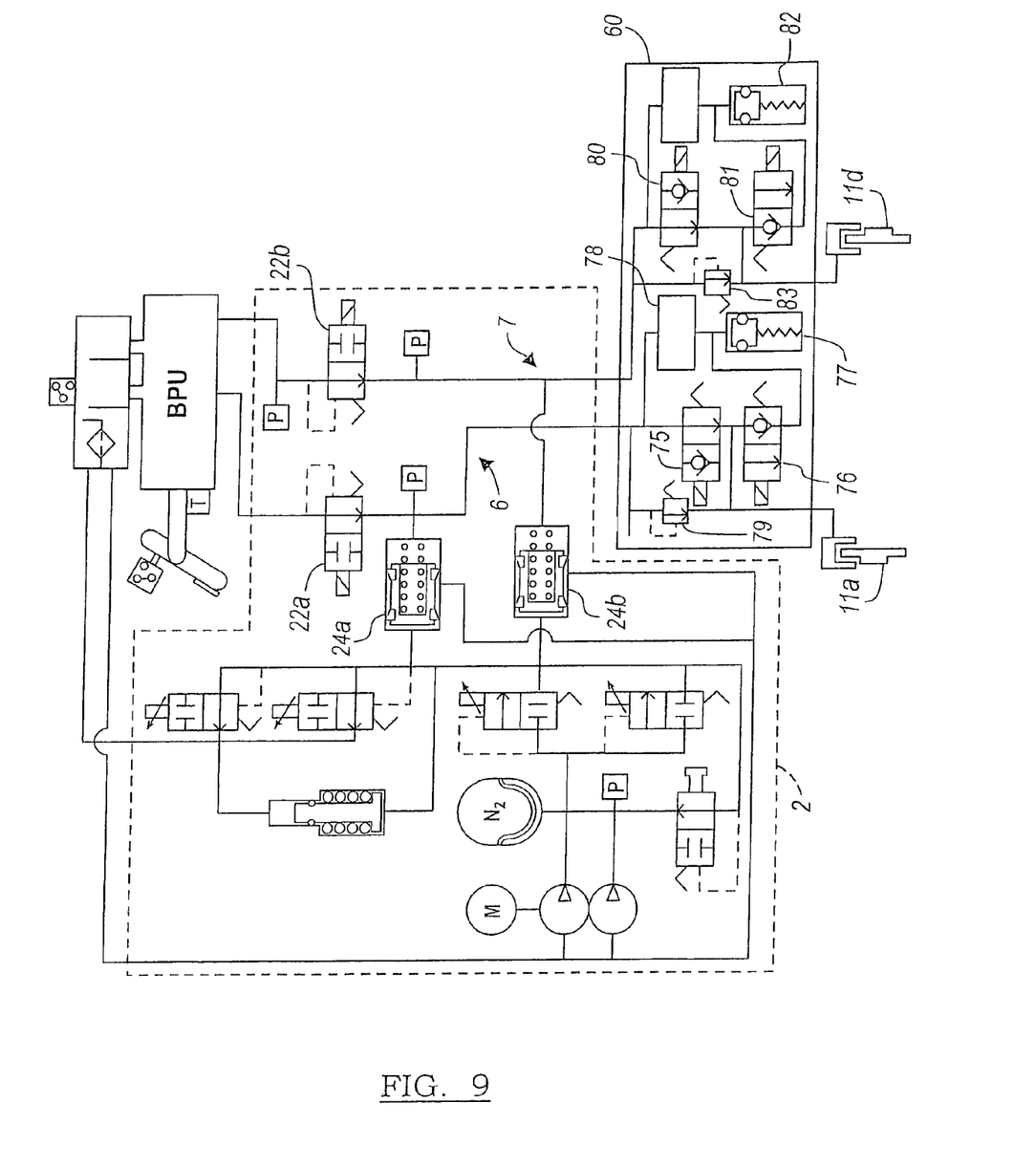
FIG. 9 is a schematic of a brake module and the ABS module utilizing isolation valves for over-pressurization according to an eighth preferred embodiment of the present invention.

Referring to FIG. 9, a schematic is shown integrating a second set of valves within the ABS module 60 for relieving over-pressurization from the third circuit 7. Although the ABS module 60 is shown as a single module integrating the valves for actuating each brake actuator, individual ABS modules are used such that a respective ABS module includes a respective set of valves and accumulators for actuating a respective brake actuator. A second isolation valve 80 is ported to allow a bi-directional flow of pressurized brake fluid to the second brake actuator 11d. When in the de-energized position, the second isolation valve 80 allows the flow of pressurized brake fluid to actuate the second brake actuator 11d. When in the energized position, additional pressurized brake fluid is prevented from flowing to second brake actuator 11d.

In the event of an over-pressurization condition in the third circuit 7 while the second isolation valve 80 is energized, a relief valve 83 is provided for relieving pressure from the third circuit 7. The relief valve 83 is disposed in parallel with the second isolation valve 80. When a predetermined amount brake fluid pressure is exerted on the relief valve 83, the relief valve 83 opens to allow the flow of pressurized brake fluid from the third circuit 7 to the second brake actuator 11d. If an over-pressurization condition occurs at the second brake actuator 11d, a second dump valve 81 is provided to alleviate the over-pressurization of brake fluid from the second brake actuator 11*d*. A second LPA 82 is provided to store the released pressurized brake fluid from the second dump valve 81. In addition, a first relief valve 79 may be disposed in parallel with the first isolation valve 75 for alleviating the over-pressurization condition from the second circuit 6.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A vehicle braking system comprising:
   a manually-operated master cylinder;
   a first brake module, said brake module comprising:
      a motor-driven pump supplying pressurized fluid;
      a first circuit of fluid supplied by said pump;
      a pressure regulating valve arrangement selectively supplying fluid from said pump to said first circuit so as to control the pressure of said fluid in said first circuit;
      a second circuit of brake fluid supplied by said master cylinder; and
      a third circuit of brake fluid supplied by said master cylinder;
   a first pair of brake actuators operated by the application of pressurized brake fluid in said second circuit;
   a second pair of brake actuators operated by the application of pressurized brake fluid in said third circuit;
   a first fluid separator unit coupled to said first circuit and said second circuit for substantially preventing the intermixing of pressurized brake fluid between said first circuit and said second circuit, said first fluid separator unit having a moveable pressure boundary which enables, through movement thereof said second circuit of pressurized brake fluid to selectively act upon said first pair of brake actuators in response to said first circuit of pressurized brake fluid acting upon said first fluid separator unit;
   a second fluid separator unit coupled to said first circuit and said third circuit for substantially preventing the intermixing of pressurized brake fluid of said first circuit and said third circuit, said second fluid separator unit having a moveable pressure boundary which enables, through movement thereof said third circuit of pressurized brake fluid to selectively act upon said second pair of brake actuators in response to said first circuit of pressurized brake fluid acting upon said second fluid separator unit; and
   a second brake module formed separately from the first brake module, said second brake module comprising fluidic components to provide secondary braking functionality to said first pair of brake actuators and said second pair of brake actuators;
   wherein said first brake module and said second brake module cooperate to selectively apply a braking torque to one brake actuator of said first pair and said second pair of brake actuators.

2. The vehicle braking system of claim 1 wherein said second circuit and said third circuit are connected to said first pair of brake actuators and said second pair of brake actuators, respectively, through said second brake module, said second brake module comprising an anti-lock braking module.

3. The vehicle braking system of claim 2 wherein said brake module further comprises a first isolation valve for alleviating over-pressurization of brake fluid within said second circuit and a second isolation valve for alleviating over-pressurization of brake fluid within said third circuit.

4. The vehicle braking system of claim 3 wherein said first isolation valve diverts said brake fluid into said first pair of brake actuators.

5. The vehicle braking system of claim 4 wherein said brake module includes a first relief valve in parallel with said first isolation valve for diverting said brake fluid into said first pair of brake actuators in response to said over-pressurization of brake fluid in said second circuit.

6. The vehicle braking system of claim 3 wherein said brake module further comprises a first low pressure accumulator for storing brake fluid in response to said over-pressurization of brake fluid in said second circuit.

7. The vehicle braking system of claim 6 wherein said brake module further comprises a first dump valve, said first dump valve diverts said brake fluid into said first low pressure accumulator.

8. The vehicle braking system of claim 3 wherein said brake module further comprises a second low pressure accumulator for storing brake fluid in response to said over-pressurization of brake fluid in said third circuit.

9. The vehicle braking system of claim 8 wherein said brake module further comprises a second dump valve, said second dump valve diverts said brake fluid into said second low pressure accumulator.

10. The vehicle braking system of claim 3 wherein said brake module includes a second relief valve in parallel with said second isolation valve for diverting said brake fluid into said second pair of brake actuators in response to said over-pressurization of brake fluid in said third circuit.

11. The vehicle braking system of claim 2 wherein said brake module further comprises a first relief valve for alleviating over-pressurization of brake fluid within said second circuit and a second relief valve for alleviating over-pressurization of brake fluid within said third circuit.

12. The vehicle braking system of claim 11 wherein said first relief valve is integrated within said first fluid separator unit and said second relief valve is integrated within said second fluid separator unit.

13. The vehicle braking system of claim 2 wherein said second brake module further comprises a traction control module.

14. The vehicle braking system of claim 2 wherein said second brake module further comprises a vehicle stability control module.

15. The vehicle braking system of claim 1 wherein said pressure regulating valve arrangement includes four proportional valves, wherein a first proportional valve and a second proportional valve are open and closeable to provide pressurized brake fluid from said first circuit to selectively act upon said first and second fluid separator units, wherein a third proportional valve and a fourth proportional valve are open and closeable to relieve said pressurized brake fluid from acting on said first and second fluid separator units.

16. The vehicle braking system of claim 15 wherein said first proportional valve and said third proportional valve are fluidically connected to said first fluid separator unit to provide said pressurized brake fluid from said first circuit to selectively act on said first fluid separator unit, and wherein said second proportional valve and said fourth proportional valve are fluidically connected to said second fluid separator unit to provide said pressurized brake fluid from said first circuit to selectively act on said second fluid separator unit.

17. The vehicle braking system of claim 16 wherein said four proportional valves comprise two-way proportional valves.

18. The vehicle braking system of claim 17 wherein said first and second proportional valves are two-way normally closed valves and said third and said fourth proportional valves are two-way normally open valves.

19. The vehicle braking system of claim 1 wherein said pressure regulating valve arrangement comprises a single three-way proportional valve.

20. The vehicle braking system of claim 1 wherein said first brake module further comprises an accumulator connected in fluid communication with said pump and said pressure regulating valve arrangement.

21. The vehicle braking system of claim 1 further comprising an electronic control module for electrically controlling the first brake module.

22. A hydraulic brake module adapted for connection to a brake system for a vehicle having at least four wheels and a hydraulic brake system, each wheel being provided with a respective brake and hydraulic brake actuator, each of the brake actuators being connected to a master cylinder, the mater cylinder being actuated by a manually operated brake pedal, at least two of the brake actuators being connected to the master cylinder via a respective one of a first conduit and a second conduit, an ABS unit, including hydraulic components and an electronics module controlling the operation of the hydraulic components of the ABS unit connected to the first conduit and the second conduit being interposed between the at least two brake actuators and the master cylinder to provide at least anti-lock braking functions, which hydraulic brake module adapted for connection to such a brake system comprises:

- a body formed separately from the ABS unit and the master cylinder of such a brake system;
- a first circuit of pressurized brake fluid formed in said body,
- a second circuit of pressurized brake fluid formed in said body, said second circuit having at least one port formed in said body through which said second circuit may be connected with the first conduit of the brake system between the master cylinder and the ABS unit;
- a third circuit of pressurized brake fluid formed in said body said third circuit having at least one port formed in said body through which said third circuit may be connected with the second conduit of the brake system between the master cylinder and the ABS unit;
- an electrically operated pump mounted on said body, the pump being plumbed to urge brake fluid through said first circuit;
- a first fluid separator unit coupled to said first circuit and said second circuit for substantially preventing the intermixing of pressurized brake fluid from said pump in said first circuit with brake fluid in said second circuit, said first fluid separator unit having a moveable pressure boundary which enables, through movement thereof, pressure in said first circuit to he transmitted to said second circuit such that, when said second circuit is connected in communication with the first conduit, and the ABS unit permits, the fluid in said second circuit thus pressurized though the fluid separator unit will actuate the brake actuator connected to the first conduit;
- a second fluid separator unit coupled to said first circuit and said third circuit for substantially preventing the intermixing of pressurized brake fluid from said pump in said first circuit with brake fluid in said third circuit, said second fluid separator unit having a moveable pressure boundary which enables, through movement thereof, pressure in said first circuit to he transmitted to said third circuit such that, when said third circuit is connected in communication with the second conduit, and the ABS unit permits, the fluid in said third circuit thus pressurized though the fluid separator unit will actuate the brake actuator connected to the second conduit; and
- a pressure regulating valve arrangement selectively supplying fluid to said first circuit so as to control the pressure of said fluid in said first circuit.

23. The vehicle braking system of claim 22 wherein said pressure regulating valve arrangement includes four proportional valves, wherein a first proportional valve and a second proportional valve are open and closeable to provide pressurized brake fluid from said first circuit to selectively act upon said first and second fluid separator units, wherein a third proportional valve and a fourth proportional valve are open and closeable to relieve said pressurized brake fluid from acting on said first and second fluid separator units.

24. The vehicle braking system of claim 22 wherein said first proportional valve and said third proportional valve are fluidically connected to said first fluid separator unit to provide said pressurized brake fluid from said first circuit to selectively act on said first fluid separator unit wherein said second proportional valve and said fourth proportional valve are fluidically connected to said second fluid separator unit to provide said pressurized brake fluid from said first circuit to selectively act on said second fluid separator unit.

25. The vehicle braking system of claim 22 wherein said first and second proportional valves are two-way normally closed valves and said third and said fourth proportional valves are two-way normally open valves.

* * * * *